United States Patent [19]
Waser, Jr.

[11] 3,830,274
[45] Aug. 20, 1974

[54] ELASTOMER BLENDS AND TIRE SIDEWALLS PREPARED THEREFROM

[75] Inventor: Harold R. Waser, Jr., Cuyahoga Falls, Ohio

[73] Assignee: The Goodyear Tire & Rubber Company, Akron, Ohio

[22] Filed: May 11, 1972

[21] Appl. No.: 252,436

[52] U.S. Cl............ 152/355, 152/353, 152/DIG. 12, 156/116, 260/4 R, 260/5, 260/894, 260/888, 260/899, 260/23.7 M, 260/41.5 R
[51] Int. Cl....................... B29h 21/02, B60c 13/00
[58] Field of Search. 156/116; 260/5, 4 R, 894–888, 260/899; 152/352, 353, 355, DIG. 12

[56] References Cited
UNITED STATES PATENTS

| | | | |
|---|---|---|---|
| 2,874,746 | 2/1959 | Nichols | 156/116 |
| 3,356,764 | 12/1967 | Gentile | 260/5 |
| 3,443,619 | 5/1969 | Kindle | 260/5 |
| 3,454,462 | 7/1969 | Hawley | 260/5 |
| 3,471,462 | 10/1969 | Matsumoto et al. | 260/94.3 |
| 3,630,974 | 6/1971 | Ladocsi et al. | 260/5 |
| 3,658,732 | 4/1972 | Ballini et al. | 260/5 |
| 3,704,741 | 12/1972 | Turk | 260/5 |

Primary Examiner—Clifton B. Cosby
Attorney, Agent, or Firm—F. W. Brunner; H. C. Young, Jr.

[57] ABSTRACT

An elastomer blend and pneumatic tire sidewall prepared therefrom where said elastomeric blend comprises specific amounts of cis 1,4-isoprene selected from natural and snythetic rubber, an ethylene-propylene-conjugated diene terpolymer, bromobutyl rubber and a cis 1,4-polybutadiene having a gel content of less than 3 percent, a number average molecular weight in the range of about 80,000 to about 300,000 and a heterogeneity index of about 3.5 to about 4.2, wherein said elastomeric blend cured with sulfur has a 300 percent modulus in the range of about 3 to 4 meganewtons per square meter. The elastomeric blend has particular utility as an outer sidewall layer and a cover strip layer adhered to the rubber sidewall portion of a pneumatic rubber tire. The elastomeric blend exhibits a substantially improved break resistance to flexing at elevated temperatures and a substantially improved ability to adhere to a pneumatic rubber tire carcass.

9 Claims, 3 Drawing Figures

PATENTED AUG 20 1974 3,830,274
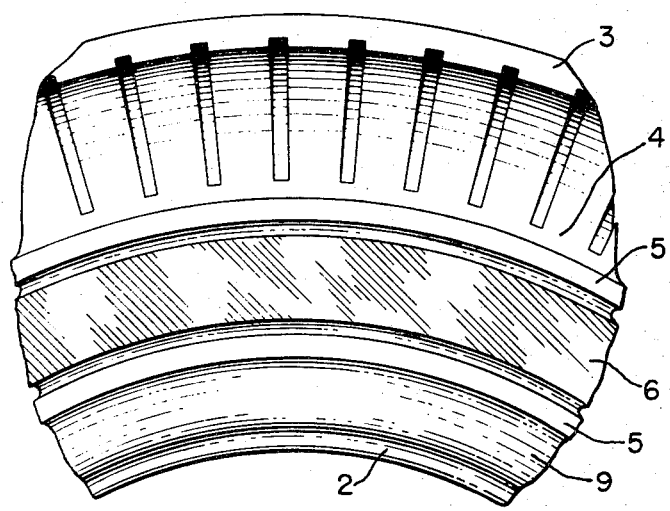
FIG. 1
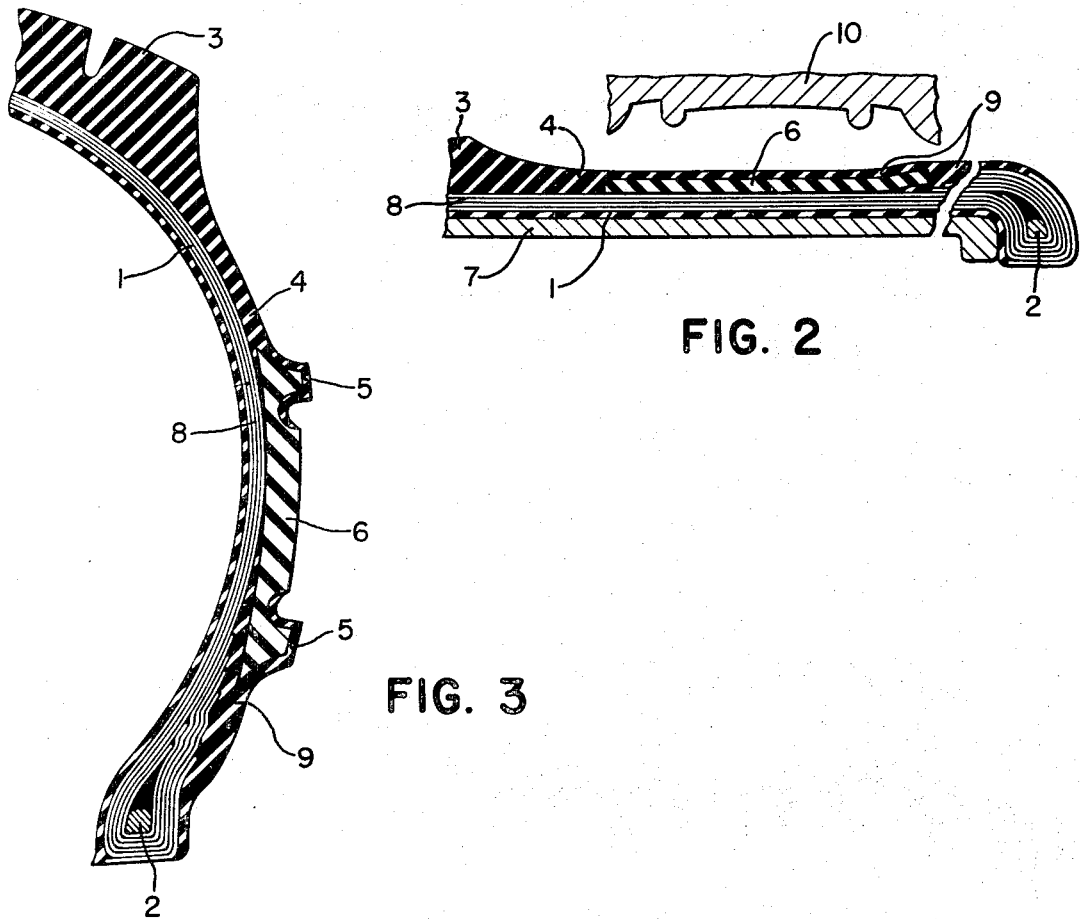
FIG. 2
FIG. 3

ELASTOMER BLENDS AND TIRE SIDEWALLS PREPARED THEREFROM

This invention relates to a pneumatic rubber tire having an outer sidewall of a novel composition. The invention further relates to said novel composition for such sidewall.

Pneumatic rubber tires are often made with decorative sidewalls colored in contrast to the tread, such as white sidewalls colored with titanium dioxide pigment. However, such sidewalls are subjected to extensive flexing and continual distortion under normal hot running conditions of the tire under load. Degradation of the sidewall under these conditions is quickly and dramatically visible by flex-cracking, environmental chemical action and inadequate adhesion to the tire carcass. The hot flex-cracking and atmospheric chemical action, such as ozone attack, erode and degrade the sidewall. Adhesion deficiency of the layers of rubber at the elevated operating temperatures can typically result in a separation of the sidewall from the carcass. All these degradation factors promote tire failure hazards.

Therefore, it is an object of this invention to provide a pneumatic tire with a sidewall of a novel rubber composition having improved flex-life and improved adhesion to the carcass under hot distortive operating conditions.

Heretofore, it has been taught that an elastomer blend of an ethylene-propylene terpolymer, a halobutyl rubber and a high unsaturation rubber can be used in articles such as tires U.S. Pat. No. 3,630,974). However, it has now been discovered that a sidewall of a pneumatic tire which is subject to extensive flexing under hot distortive stress conditions can be prepared from a specific elastomer blend of a specific combination of an ethylene-propylene terpolymer, bromobutyl rubber and a required balance of cis 1,4-polyisoprene selected from natural rubber and synthetic natural rubber and a rubbery cis 1,4-polybutadiene having a particularly broad molecular weight distribution. The elastomer blend of this invention provides substantially improved hot flex life and carcass adhesion properties for such a tire sidewall as a specific combination not taught by the said patent disclosure.

In accordance with this invention, a novel pneumatic rubber tire is provided comprising a generally toroidal shaped carcass with a circumferential tread, spaced beads and basic rubber sidewall portions extending between said tread and beads and having adhered to said rubber sidewall portion an outer sidewall layer and a cover strip layer, said cover strip extending from said bead portion toward said tread and overlapping a portion of said outer sidewall, wherein said outer sidewall layer and cover strip layer are comprised of an elastomeric blend of from about 20 to about 60 weight percent elastomeric cis 1,4-polyisoprene selected from natural and synthetic natural rubber, from about 20 to about 35 weight percent rubbery ethylene, propylene, nonconjugated diene terpolymer, from about 20 to about 45 weight percent bromobutyl rubber and from about 20 to about 30 weight percent polybutadiene rubber having a cis 1,4-content of at least about 95 percent, a gel content of less than about 3 weight percent and a heterogeneity index of about 3.5 to about 4.2, wherein said elastomeric blend cured with sulfur has a 300 percent modulus in the range of about 3 to about 4 meganewtons per square meter ($MN/M^2$).

The weight percent of the individual rubber components in the blend is based on 100 percent of their combination. The terms elastomer and rubber are used in the classical sense as a substance that can be stretched at room temperature to at least twice its original length and, after stretched with the stress removed, returns with force to approximately its original length in a short time.

In the practice of this invention, it is preferred that said outer sidewall layer blend be comprised of about 40 to about 60 weight percent of the polyisoprene, about 20 to about 30 weight percent of the terpolymer, about 20 to about 40 weight percent of the bromobutyl rubber and about 20 to about 30 weight percent of the polybutadiene.

In further practice of this invention, it is preferred that the cover strip layer blend is comprised of about 20 to about 30 weight percent of the polyisoprene, about 20 to about 30 weight percent of said terpolymer, about 30 to about 40 weight percent of the bromobutyl rubber and about 20 to about 30 weight percent of the polybutadiene.

It should be understood by one skilled in the pneumatic tire and in the rubber compounding art that said outer sidewall and cover strip layers can be compounded by methods generally known in the rubber compounding art, such as by mixing with the uncured composition various processing and curing aids, extenders and fillers such as sulfur, curing accelerators or retarders, anti-oxidants and anti-ozonants, pigments and rubber processing oils. However, in order to maintain compatability with the basic pneumatic rubber tire carcass, it is required that the said cured sidewall and cover strip layers are characterized by having a 300 percent modulus at 25° C. in the range of about 3 to about 4, preferably about 3.3 to about 3.7 meganewtons per square meter ($MN/M^2$).

In the practice of this invention, natural and synthetic natural rubber can be used singularly or in combination. Preferably natural rubber is used. The quality of the natural rubber is preferably of at least No. 2 pale crepe sheet quality which generally means it is preferably selected from natural rubber of No. 2 and No. 1 pale crepe sheet quality. The synthetic natural rubber is a rubbery cis 1,4-polyisoprene generally prepared by addition polymerizing isoprene in solution and in the presence of a coordination catalyst system to form the elastomeric polymer containing at least about a 95 percent cis 1,4 structure.

For this invention, the terpolymer rubber preferably comprises an ethylene to propylene weight ratio of about 50:50 to about 75:25 and contains about 2 to about 10, preferably 2 to about 5, weight percent units derived from the nonconjugated diene. The preferred diene is selected from dicyclopentadiene, 1,4-hexadiene, 5-methylene-2-norbornene and 5-ethylidene norbornene. Dicyclopentadiene is particularly preferred.

The bromobutyl rubber is typically prepared by the normal solution copolymerization of isobutylene and isoprene to form a butyl-type rubbery copolymer containing about 85 to about 95 weight percent isobutylene and correspondingly about 15 to about 5 weight percent isoprene. The isobutylene/isoprene copolymer is then brominated in solution by methods known in the bromination art to form the bromobutyl rubber containing about 1.7 to about 2.5 and preferably about 1.8 to about 2.4 weight percent bromine and about 0.8 to about 1.8 and preferably about 1 to about 1.5 mole percent unsaturation expressed in units of carbon to carbon double bonds per 100 grams of polymer as typically determined by nuclear magnetic resonance analysis.

It is important that the cis 1,4-polybutadiene is generally characterized by having a heterogeneity index in the range of about 3 to about 6 and preferably about 3.5 to about 5 and a gel content less than about 5 and generally about 0 to about 3 weight percent. The polybutadiene is further characterized by having a cis 1,4 structure of at least about 95 percent and generally in the range of about 96 to about 99 percent and a number average molecular weight in the range of about 80,000 to about 300,000, although about 80,000 to about 170,000, and preferably about 100,000 to about 150,000, are preferable for normal useage with the upper ranges of 250,000 or 300,000 being used after first oil extending the polybutadiene to reduce its toughness.

The heterogeneity index for the cis 1,4-polybutadiene is a ratio of its number average and weight average molecular weights. Such a high required heterogeneity index of the polybutadiene demonstrates a broad molecular weight distribution and distinguishes it from other polybutadienes typically having narrow molecular weight distributions with heterogeneity indexes of about 1.4 to about 3. Both the number average and the weight average molecular weight are of the type generally determined by gel permeation chromatography (GPC), for example, on a Waters GPC unit at room temperature while using tetrahydrofuran as the solvent.

The gel content of the cis 1,4-polybutadiene is determined by the precent undissolved sample of polybutadiene in toluene after immersion for 48 hours at about 25° C.

Further objects and advantages of this invention with regard to pneumatic rubber tires will be apparent when the specification is read in conjunction with the accompanying drawings in which FIG. 1 is a side elevational view of a penumatic rubber tire employing this invention, FIG. 2 is a cross-sectional view, with parts broken away, of a green tire layup and a portion of the mold for the tire and FIG. 3 is a partial cross-sectional view of the molded and cured rubber tire.

Referring to the drawings, the cured rubber tire comprises the usual carcass (1), bead portions (2), tread portion (3) and connecting sidewall portion (4). One or more scuff ribs (5) may extend circumferentially around the side of the tire to protect an outer colored sidewall layer (6).

More specifically, the tire is typically formed on a building drum (7) with the usual carcass plies (8), bead (2) and tread (3). At least one of the sidewalls (4) includes an outer adherent colored sidewall layer (6) between the ribs (5) other than black, and an adherent cover strip (9) extending from the bead portion (2) over the said colored sidewall overlay (6). If desired, the cover strip overlay can be extended to the tread portion (3).

The green tire is then placed in a mold (10) where it is heated and cured to form the cured tire more clearly shown as a cross-sectional view by FIG. 3.

The cured sidewall cover strip is buffed to remove a portion thereof and expose the colored sidewall overlay (6) as demonstrated in the cross-sectional view of FIG. 3.

Thus, the completed vehicular tire, which typically may be of the bias, bias-belted or radial construction, exhibits the carcass-adherent colored sidewall overlay and cover strip having improved hot flex and hot adhesion properties.

The practice of this invention is further illustrated by reference to the following examples which are intended to be representative rather than restrictive of the scope of the invention. Unless otherwise indicated, all parts and percentages are by weight.

EXAMPLE I

Samples of the outer sidewall and cover strip compositions of this invention were prepared and tested for hot flex endurance and ozone degradation resistance and compared with typical sidewall and cover strip compositions. Their adhesion to carcass plies was also tested and compared.

The samples were prepared by mix-milling the following recipes shown in Table 1 and milling out sheets of each having a thickness of about 0.75 inch. In the table, the test samples are identified as "Test" and comparative typical compositions normally used are identified as "Control."

Table 1

| Compound | White Sidewall | | Cover Strip | |
|---|---|---|---|---|
| | Test | Control | Test | Control |
| Natural Rubber | 40 | 40 | 25 | 25 |
| Butadiene/Styrene Rubber | 0 | 35 | 0 | 0 |
| EPDM | 20 | 25 | 20 | 20 |
| Polybutadiene | 20 | 0 | 25 | 25 |
| Bromobutyl Rubber | 20 | 0 | 30 | 0 |
| Chlorobutyl Rubber | 0 | 0 | 0 | 30 |
| Carbon Black | 0 | 0 | 30 | 30 |
| Titanium Dioxide | 45 | 30 | 0 | 0 |
| Sulfur | 1.5 | 1.5 | .75 | .75 |
| Accelerator | 1.3 | 1.3 | 1.7 | 1.7 |
| Magnesium Oxide | 0 | 0 | 0.5 | 1 |
| Zinc Oxide | 3 | 16.5 | 5 | 3 |
| Antioxidant (phenolic) | 0.5 | 0.5 | 2 | 2 |
| Tackifying Resin | 1 | 0 | 0 | 7 |
| Clay | 20 | 25 | 0 | 0 |
| Stearic Acid | 1 | 1 | 1 | 1 |

In this table the natural rubber was No. pale crepe sheet. The EPDM rubber was a terpolymer of ethylene, propylene and dicyclopentadiene having an ethylene to propylene weight ratio of about 68:32 and contained about 3 to 4 weight percent dicyclopentadiene. The polybutadiene had a gel content of about zero, a cis 1,4 content of at least about 95 percent, a number molecular weight average of about 140,000 and a heterogeneity index of about 3.8. The bromobutyl rubber was an elastomeric isobutylene/isoprene copolymer containing about 1.9 weight percent bromine and about 1.3 mole percent unsaturation. Titanium dioxide was used as the white coloring pigment for the white sidewall compositions, the anti-oxidant was of the nonstaining phenolic type and the accelerator was of the type normally used in sulfur vulcanizations.

Further samples were similarly prepared of a typical carcass rubber for adhesion testing of the recipe shown in Table 2.

Table 2

| Compound | Parts |
| --- | --- |
| Natural Rubber (Brown Crepe No. 2) | 100 |
| Process Oil | 5 |
| Tackifying Resins | 7.5 |
| Stearic Acid | 2 |
| Antioxidant (phenolic) | 1 |
| Carbon Black | 30 |
| Sulfur | 2.75 |
| Zinc Oxide | 3 |
| Accelerator | 1.55 |

Test samples were cut from the sheets of Table 1 which had been cured at about 150° C. for about 18 minutes and comparatively tested for hot flex degradation (66 percent Flex Test) at 93° C. and hot ozone degradation (Kinetic Ozone Test) at about 39° C.

Further test samples were cut of he uncured composition and tested for cure adhesion (Strebler Adhesion Test) to themselves and to a rubber carcass sample from Table 2.

The results of these tests are shown in Table 3, with the hot flex test measured in minutes to failure, the ozone test expressed as a ratio of crack density to crack size based on a crack density rating of 0 to 4 and a crack size rating of 1 for .01 inch cracks to 10 for 0.25 inch cracks and The Strebler Adhesion Test measured in pounds required to pull the laminated stocks apart.

Table 3

| | White Sidewall | | Cover Strip | |
| --- | --- | --- | --- | --- |
| | Test | Control | Test | Control |
| 66% Flex Test (minutes) | 26 | 11 | 116 | 27 |
| Kinetic Ozone Test (crack rating) | 0/0 | 0/0 | 0/0 | 0/0 |
| Adhesion Test (pounds) | | | | |
| a. Itself | 17 | 4 | 58 | 18 |
| b. Carcass Composition | 12 | 7 | 13 | 6 |

The hot flex test was conducted by obtaining a cured sample 4.44 inches long by 0.9 inch wide with a thickness of 0.075 inch, and cutting a 0.3 inch diameter hole in its center. The sample was clamped on both ends and flexed in a 93° C. atmosphere at the rate of 360 cycles per minute between elongations of about 10 percent and about 61 percent. The time required for the sample to break was recorded in minutes.

The Kinetic Ozone Test was conducted by obtaining a cured sample of the size 6 inches by 0.5 inch and a thickness of 0.75 inch and flexing the said sample from about zero to about 25 percent elongation at the rate of 25 cycles per minute in a sealed ozone chamber at 39° C. for 48 hours in an atmosphere with ozone concentration of 50 parts per 100 million by volume. The results are expressed as a ratio of crack density to crack size with zero indicating essentially no volume of cracks and no cracks of any significant length.

The Strebler Adhesion Test was conducted by obtaining uncured samples each have dimensions of 6 inches by 3 inches and a thickness of 0.75 inch. Two samples to be tested for adhesion to each other were placed face to face with a layer of Holland cloth therebetween. The Holland cloth had a rectangular hole measuring 2 inches by 0.4 inch centered and aligned with the middle of the rectangular samples. Thus, the two samples were in direct contact with each other only at this opening in the Holland cloth. The samples were then cured at 150° C. for 28 minutes while being pressed together at a pressure of 100 pounds per square inch (psi). The samples were then tested by pulling apart with a 180° pull on an Instron or Scott Tester at 93° C., after a 15 minute warmup, at the rate of 20 inches per minute with the results being recorded in pounds.

EXAMPLE II

A cured rubber pneumatic tire was prepared with the composition of this invention having typical toroidal shape with the usual tread, bead and connecting sidewall portions. The white sidewall and cover strip layer were extruded as one piece from an extruder and adhered over the said sidewall portion in a manner shown in FIG. 2 of the drawings. The green tire was then removed from its building drum and placed in a mold and cured at 160° C. for 18 minutes to yield a shaped and cured rubber penumatic tire with an inner diameter, bead to bead, of about 14 inches, an outer diameter to the extremities of the tread of about 27 inches and an overall tire cross-section width of about 8.25 inches. The sidewall portion was then buffed to abrade away a portion of the cover strip layer and expose a portion of the white sidewall. The white sidewall and cover strip on the outer portion of the tire exhibited improved hot flex, ozone resistance and adherence to the basic carcass under operational distortive conditions of the pneumatic vehicular tire under load.

In the practice of this invention, a typical pneumatic rubber tire carcass to which the outer sidewall and cover strip layers are adhered is comprised, in addition to various fabric plies of a surfur cured elastomer selected from at least one of natural rubber, cis 1,4-polyisoprene, cis 1,4-polybutadiene and 1,3-butadiene-styrene copolymers with a 300 percent modulus at 25° C. in the range of about 3 to about 4 MN/M². Typically, the natural rubber is at least a No. 2 brown crepe quality, the isoprene and polybutadiene have at least about a 95 percent cis 1,4-structure and the butadiene-styrene copolymers comprise from about 65 to about 95, and generally about 70 to about 85, percent units derived from 1,3-butadiene.

In the further practice of this invention, the bromobutyl rubber, as hereinbefore related, generally has a bromine content in the range of about 1.5 to about 2.5 percent. The bromine content can be determined by burning a sample in a quartz tube with oxygen, passing the gaseous combustion products through sodium carbonate containing a small amount of hydrazine and titrating with silver nitrate using a silver electrode to determined an end point.

The cis 1,4-polybutadiene required by the applicant's invention to have particularly high heterogeneity index can be prepared with the teachings of U.S. Pat. Nos. 3,170,907 and 3,471,462.

While certain representative embodiments and details have been shown for the purpose of illustrating the invention, it will be apparent to those skilled in this art that various changes and modifications may be made therein without departing from the spirit or scope of the invention.

I claim:

1. In a pneumatic rubber tire comprising a generally toroidal shaped carcass with a circumferential tread, spaced beads and basic rubber sidewall portions extending between said tread and beads and having adhered to said rubber sidewall portion an outer sidewall layer and a cover strip layer, said cover strip extending from said bead portion toward said tread and overlapping a portion of said outer sidewall, wherein said outer sidewall layer and cover strip layer are comprised of an elastomeric blend of from about 20 to about 60 weight percent cis 1,4-polyisoprene selected from natural rubber of at least No. 1 pale crepe quality and synthetic natural rubber having a cis 1,4-content of at least about 95 percent, from about 20 to about 35 weight percent ethylene, propylene, nonconjugated diene terpolymers having an ethylene to propylene weight ratio of about 50:50 to about 75:25 and containing about 2 to about 10 weight percent units derived from a diene selected from dicyclopentadiene, 1,4-hexadiene and ethylidene bicycloheptene, from about 20 to about 45 weight percent bromobutyl rubber prepared by solution brominating an isobutylene/isoprene copolymer to form the bromobutyl rubber containing about 1.7 to about 2.5 weight percent bromine and about 1 to about 1.5 weight percent unsaturation and from about 20 to about 30 weight percent polybutadiene rubber having a cis 1,4-content of at least about 95 percent, a gel content of less than about 3 weight percent, a number average molecular weight in the range of about 80,000 to about 300,000 and a heterogeneity index of about 3.5 to about 4.2, wherein said elastomeric blend cured with sulfur has a 300 percent modulus in the range of about 3 to about 4 meganewtons per square meter ($MN/M^2$).

2. A pneumatic rubber tire according to claim 1 where a sample of said elastomeric blend, when cured with sulfur, 4.44 inches long by 0.9 inch wide with a thickness of 0.075 inch and a 0.3 inch diameter perforation in its center requires at least about 26 minutes to break when clamped on both ends and flexed in a 93° C. atmosphere at the rate of 360 cycles per minute between elongations of 10 percent and 61 percent.

3. A pneumatic tire according to claim 1 where the said carcass comprises a sulfur cured elastomer selected from at least one of natural rubber, cis 1,4-polyisoprene, cis 1,4-polybutadiene and 1,3-butadiene-styrene copolymers and where, in said elastomeric blend of said outer sidewall layer and cover strip layer, the terpolymer is an ethylene-propylene-dicyclopentadiene terpolymer, the cis 1,4-polybutadiene has a heterogeneity index of about 3.5 to about 5 and a number average molecular weight in the range of about 80,000 to about 170,000, where the bromobutyl rubber is a copolymer of isobutylene and isoprene containing about 85 to about 95 weight percent isobutylene and further containing about 1.8 to about 2.4 weight percent bromine and about 1 to about 1.5 mole percent unsaturation and where said elastomeric blend, when sulfur cured, is characterized by having a 300 percent modulus at 25° C. in the range of about 3.3 to about 3.7 ($MN/M^2$).

4. A pneumatic tire according to claim 3, wherein said outer sidewall layer is colored white with titanium dioxide pigment and is comprised of about 40 to about 60 weight percent of the polyisoprene, about 20 to about 30 weight percent of the terpolymer, about 20 to about 40 weight percent of the bromobutyl rubber and about 20 to about 30 weight percent of the polybutadiene.

5. An elastomeric blend suitable for said outer sidewall layer and cover strip layer of claim 1 which comprises an elastomeric blend of from about 20 to about 60 weight percent cis 1,4-polyisoprene selected from natural and synthetic natural rubber, from about 20 to about 35 weight percent ethylene, propylene, nonconjugated diene terpolymer, from about 20 to about 45 weight percent bromobutyl rubber and from about 20 to about 30 weight percent polybutadiene rubber having a cis 1,4-content of at least about 95 percent, a gel content of less than about 3 weight percent, a number average molecular weight in the range of about 80,000 to about 300,000 and a heterogeneity index of about 3.5 to about 4.2, wherein said elastomeric blend cured with sulfur has a 300 percent modulus in the range of about 3 to about 4 meganewtons per square meter ($MN/M^2$).

6. The elastomeric blend of claim 5 where said cis 1,4-polyisoprene is selected from natural rubber of at least No. 1 pale crepe quality and from polyisoprene having a cis 1,4-content of at least about 95 percent, the said rubbery ethylene, propylene, nonconjugated diene terpolymer comprises an ethylene to propylene weight ratio of about 50:50 to about 75:25 and contains about 2 to about 10 weight percent units derived from a diene selected from dicyclopentadiene, 1,4-hexadiene and ethylidene bicycloheptene, the said bromobutyl rubber is prepared by solution brominating an isobutylene/isoprene copolymer to form the bromobutyl rubber containing about 1.7 to about 2.5 weight percent bromine and about 1 to about 1.5 weight percent unsaturation where the said polybutadiene has a number average molecular weight in the range of about 80,000 to about 300,000.

7. The elastomeric blend of claim 6 where a sample of said elastomer blend, when cured with sulfur, 4.44 inches long by 0.9 inch wide with a thickness of 0.075 inch inch and a 0.3 inch diameter perforation in its center requires at least about 26 minutes to break when clamped on both ends and flexed in a 93° C. atmosphere at the rate of 360 cycles per minute between elongations of 10 percent and 61 percent.

8. The elastomeric blend of claim 6 where said terpolymer is an ethylene-propylene-dicyclopentadiene terpolymer, the cis 1,4-polybutadiene has a heterogeneity index of about 3.5 to about 5 and a number average molecular weight in the range of about 80,000 to about 170,000, where the bromobutyl rubber is a copolymer of isobutylene and isoprene containing about 85 to about 95 weight percent isobutylene and further containing about 1.8 to about 2.4 weight percent bromine and about 1 to about 1.5 mole percent unsaturation and where said elastomeric blend, when sulfur cured, is characterized by having a 300 percent modulus at 25° C. in the range of about 3.3 to about 3.7 ($MN/M^2$).

9. The elastomeric blend of claim 8 colored white with titanium dioxide and is comprised of about 40 to about 60 weight percent of the polyisoprene, about 20 to about 30 weight percent of the terpolymer, about 20 to about 40 weight percent of the bromobutyl rubber and about 20 to about 30 weight percent of the polybutadiene.

* * * * *